(12) United States Patent
Henry

(10) Patent No.: US 6,982,018 B1
(45) Date of Patent: Jan. 3, 2006

(54) ULTRASONIC SPLICING OF WEATHERSTRIPPING

(75) Inventor: Joseph Henry, Mooresville, NC (US)

(73) Assignee: Amesbury Group, Inc, Amesbury, MA (US)

( * ) Notice: Subject to any disclaimer, the term of this patent is extended or adjusted under 35 U.S.C. 154(b) by 0 days.

(21) Appl. No.: 10/687,076

(22) Filed: Oct. 16, 2003

(51) Int. Cl.
*B32B 31/16* (2006.01)

(52) U.S. Cl. .................. 156/73.4; 156/159; 156/257; 156/502; 156/510

(58) Field of Classification Search ............. 156/73.1, 156/73.4, 157, 159, 256, 257, 304.1, 304.2, 156/304.5, 304.6, 502, 507, 510, 515, 530, 156/580.1, 580.2, 268
See application file for complete search history.

(56) References Cited

U.S. PATENT DOCUMENTS

| | | | |
|---|---|---|---|
| 3,607,571 A * | 9/1971 | Tange | 156/505 |
| 4,505,780 A | 3/1985 | Sewards | |
| 4,516,971 A * | 5/1985 | Spencer | 156/159 |
| 4,867,835 A | 9/1989 | Poole | |
| 5,039,373 A | 8/1991 | Gilhaus | |
| 5,123,992 A * | 6/1992 | Kanda et al. | 156/506 |
| 5,304,266 A * | 4/1994 | Becking | 156/64 |
| 5,538,578 A | 7/1996 | Sugawara et al. | |
| 6,158,172 A * | 12/2000 | Yamane et al. | 49/489.1 |
| 6,592,704 B1 * | 7/2003 | Benzing, II | 156/264 |

* cited by examiner

*Primary Examiner*—James Sells
(74) *Attorney, Agent, or Firm*—Goodwin Procter LLP

(57) ABSTRACT

Two pieces of weatherstripping are spliced together by cutting a defined amount of a sealing element from a first piece of weatherstripping leaving an exposed backing, then overlapping a second piece of weatherstripping over the exposed portion of backing of the first piece of weatherstripping, and then ultrasonically welding the backing of the first piece of weatherstripping to the backing of the second piece of weatherstripping.

17 Claims, 10 Drawing Sheets

ULTRASONIC SPLICING OF WEATHERSTRIPPING

TECHNICAL FIELD

The invention relates to the splicing of weatherstripping, in particular the splicing of pile weatherstripping used for preventing the infiltration of air and water in door or window channels.

BACKGROUND TO THE INVENTION

One type of pile weatherstripping is manufactured by weaving a textile strip from polymer yarn and applying a resilient backing to increase rigidity and to prevent the yarn from unraveling and the textile strip from fraying. The yarn forms a pile extending from the upper surface of the backing, which is flexible. Typical backings include metals or plastic coatings.

It is often desirable to splice the ends of portions of weatherstripping together. For instance, a door or window manufacturer may want to join the end of one spool of weatherstripping to the beginning of another spool. In another scenario, flaws may be encountered in the manufacture of the weatherstripping that require removal, thereby necessitating the need to splice the resulting end pieces together.

Traditionally, the splicing of weatherstripping has been accomplished by the use of adhesive tape or by the use of a material added to the weatherstripping to create a bond, such as a wire mesh. In another adaptation, two pieces of textile strip are spliced, prior to the application of the backing, by adding a plastic material across the lower surface of the butted ends of the strip and welding the weatherstripping together ultrasonically.

Several problems have been encountered with traditional methods of splicing weatherstripping. One problem is that the joint created can have less structural integrity than the non-welded portion of the weatherstripping, which makes the joint prone to failure in use. For example, a weak joint may not adequately support the pile on the upper surface of the weatherstripping, which can result in air or water bypassing the weatherstripping. Another problem is that the addition of adhesives and other splice materials to weatherstripping increases the cross-sectional profile of the weatherstripping, which can interfere with the process of inserting the weatherstripping into a door or window groove or a channel, especially when using automated insertion equipment.

It is, therefore, an object of the invention to provide a method and apparatus for splicing weatherstripping that overcomes the difficulties encountered by conventional methods.

SUMMARY OF THE INVENTION

The invention relates generally to splicing ultrasonically two pieces of weatherstripping, such that the backings of the two pieces of weatherstripping overlap a predetermined distance and the material of the weatherstripping is used to create the splice. The resultant splice has a configuration and cross-sectional profile substantially geometrically and structurally equivalent to a non-spliced portion of the weatherstrip. The invention has the benefit of decreasing the cross-sectional profile of the region of the weatherstripping containing the splice over conventional methods. This facilitates inserting the weatherstripping into a groove or a channel, thereby leading to productivity gains. Also, the joint created has improved rigidity and structural integrity compared to conventional splices, enhancing the weatherstripping's sealing function. Moreover, less scrap is produced during manufacturing, since the splices can be formed readily and reliably; therefore, rework can be eliminated.

In one aspect, the invention relates to a device for joining two pieces of weatherstripping. In one embodiment, the device includes a first apparatus for receiving a first piece of weatherstripping and cutting a predetermined amount of a sealing element from the first piece of weatherstripping. Also included is a second apparatus for ultrasonically joining the first piece of weatherstripping and a second piece of weatherstripping.

Another aspect of the invention relates to a method of splicing weatherstripping including a sealing element and a backing element. The method includes cutting a portion of the sealing element from a first piece of weatherstripping, leaving an exposed portion of the backing element. Also included in the method are the steps of overlapping the exposed portion of the backing element with a backing element of a second piece of weatherstripping and ultrasonically joining the exposed portion of the backing element of the first piece of weatherstripping to the backing element of the second piece of weatherstripping.

Various embodiments of the foregoing aspect include, for instance, pressing the exposed portion of the backing element of the first piece of weatherstripping against the backing element of the second piece of weatherstripping, prior to ultrasonically joining the two pieces of weatherstripping. The cutting step can further include cutting the exposed portion of the backing element at an angle or in a V-shape. In another embodiment, the cutting step may include inserting the first piece of weatherstripping into an apparatus and actuating a blade to cut a portion of the sealing element. In another aspect, the invention relates to a spliced weatherstripping produced in accordance with the described method.

In another aspect, the invention relates to an apparatus for cutting weatherstripping including a sealing element and a backing element. The apparatus includes a base for receiving one end of the weatherstripping and a blade moveably coupled to the base for cutting a portion of the sealing element.

The apparatus can also include a variety of optional features or characteristics alone or in combination. For example, the blade of the apparatus may be coupled to a handle rotatably mounted to the base. The apparatus can include a track disposed on the base for receiving the weatherstripping. The track guides and reliably locates the weatherstripping relative to the blade. In another embodiment, the apparatus may include a stop disposed on the base for limiting a length of weatherstripping received by the base.

In yet another aspect, the invention relates to an apparatus for joining pieces of weatherstripping. The apparatus includes a base including a channel for receiving a first piece of weatherstripping at one end and a second piece of weatherstripping at an opposite end, where the first and second pieces of weatherstripping are in overlapping contact at, at least one point. An ultrasonic welder may be used in conjunction with the base for joining the first piece of weatherstripping and the second piece of weatherstripping at the point of overlapping contact. The apparatus can further include clamps attached to the base for holding the first piece of weatherstripping and the second piece of weatherstripping in place. Apparatus for pressing the first piece of weatherstripping and the second piece of weatherstripping together at the point of overlapping contact can also be included. The base of the apparatus can include two pieces, with one piece slideably disposed relative to the other piece.

These and other objects, along with advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis generally being placed upon illustrating the principles of the invention. In the following description, various embodiments of the present invention are described with reference to the following drawings, in which.

DETAILED DESCRIPTION OF THE DRAWINGS

Figure 1:
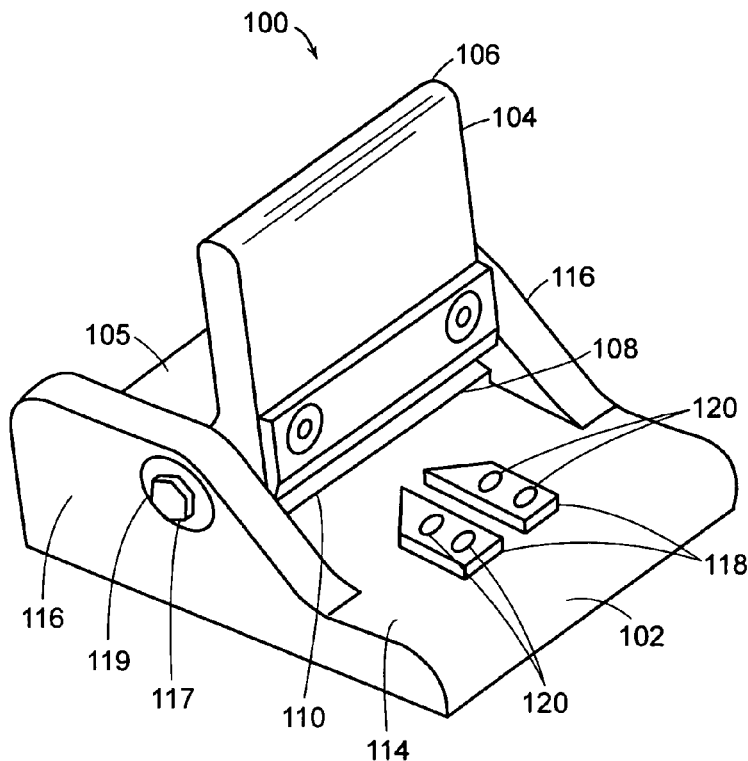
FIG. 1 is a schematic perspective view of a cutting apparatus in accordance with one embodiment of the invention.
Figure 2:
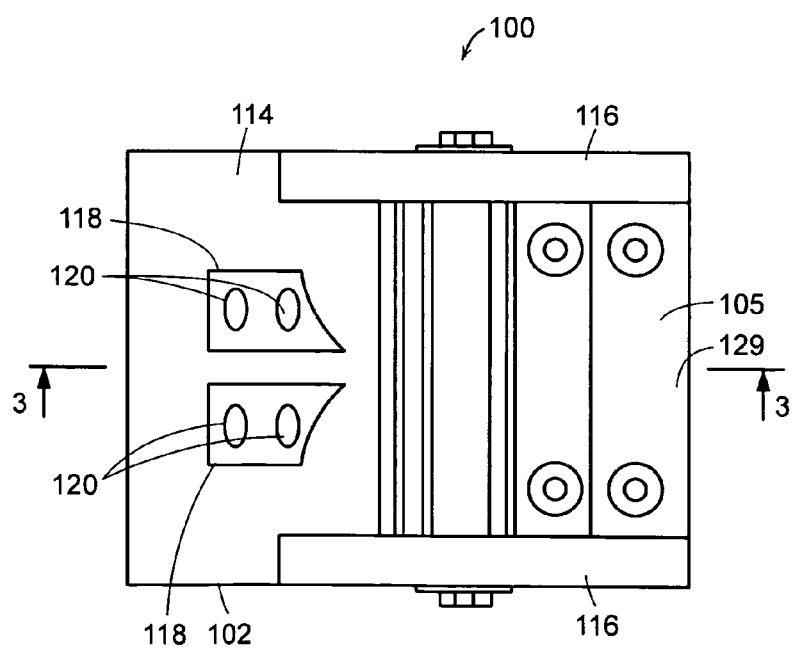
FIG. 2 is a schematic top view of the cutting apparatus of FIG. 1.
Figure 3:
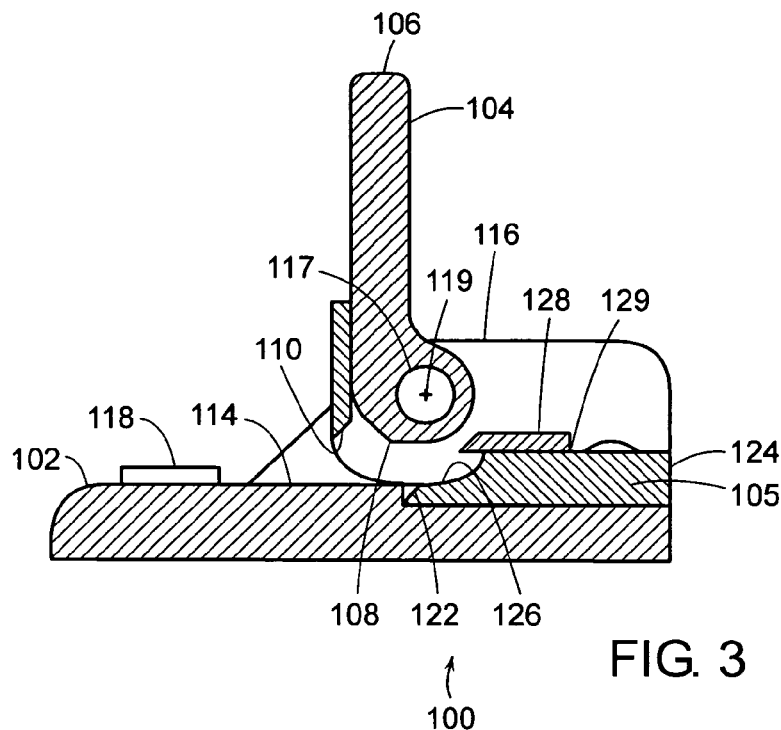
FIG. 3 is a schematic cross-sectional view of the cutting apparatus of FIG. 1 taken along line 3—3 of FIG. 2.

The invention generally relates to devices and methods for improving the splicing of weatherstripping, such as woven pile weatherstripping having a polymer backing. The invention includes an apparatus for cutting a first piece of weatherstripping, such that a predetermined amount of the sealing element, and optionally, a portion of the backing of the weatherstripping are removed. Also included in the invention is a welding apparatus that ultrasonically splices the cut end of the first piece of weatherstripping with an uncut end of a second piece of weatherstripping.

Referring to FIGS. 1–4C, depicted is an apparatus 100 for cutting a piece of weatherstripping. The apparatus 100 consists of a base 102, a rotatably mounted handle 104, and an adjustable platform 105. The base 102, rotatably mounted handle 104, and adjustable platform 105 can be machined from a variety of materials, including metals like aluminum, polymers like nylon, wood, and metal alloys.

The rotatably mounted handle 104 has a proximal end 106 for gripping and a distal end 108 that includes a cutting member 110. A commercially available cutting member 110, such as a knife blade made by Stanley Tools Product Group (New Britain, Conn., USA), can be attached to the rotatably mounted handle 104 and used with the apparatus 100.

The base 102 of the apparatus 100 includes a top surface 114 and two side walls 116, the side walls 116 being generally parallel to each other and extending substantially vertically from the top surface 114. Two aligned through holes 117 in the side walls 116 receive a pin 119 that secures the rotatably mounted handle 104 to the base 102, such that the handle 104 can rotate relative to the base 102. Rotation of the pin 119 and, hence, the rotatably mounted handle 104 relative to the base 102 may be achieved by, for example, mounting the pin 119 in a journal bearing in each through hole 117, or by mounting the pin 119 in each through hole 117 using a ball and roller bearing.

Figure 4A:
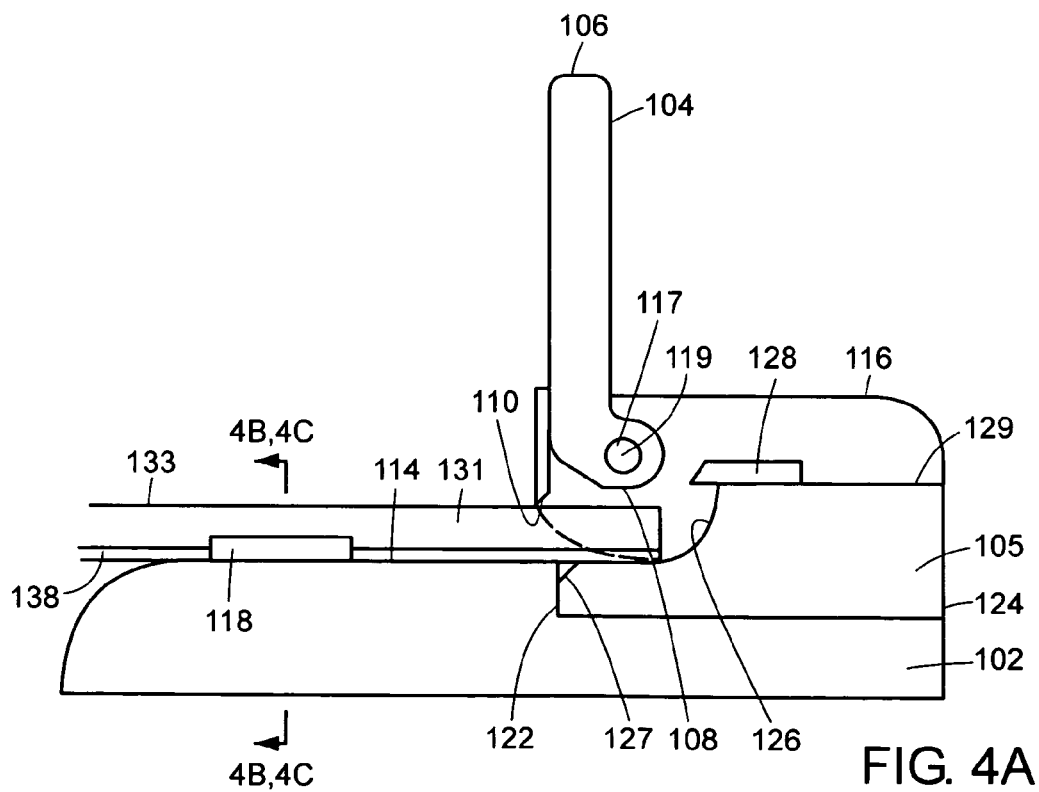
FIG. 4A is an enlarged view of an alternative cutting apparatus in accordance with another embodiment of the invention, shown with a piece of weatherstripping inserted into the cutting apparatus.
Figure 4C:
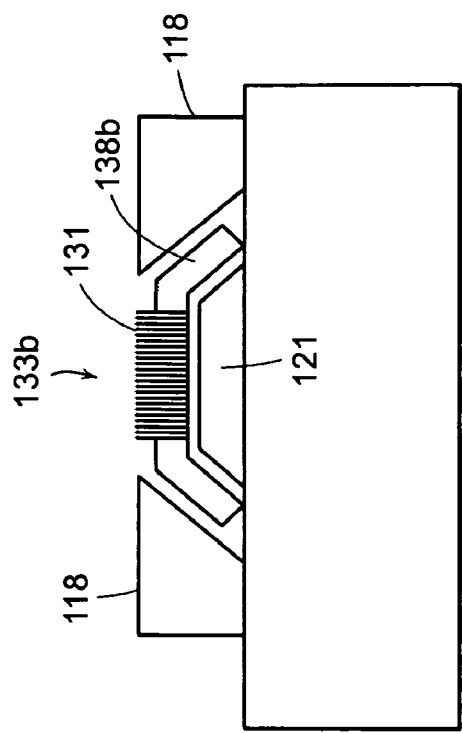
FIG. 4C is a schematic cross section of the cutting apparatus of FIG. 4A taken along line 4C—4C of FIG. 4A with modified guide pieces receiving a piece of weatherstripping having a curved backing.
Figure 4B:
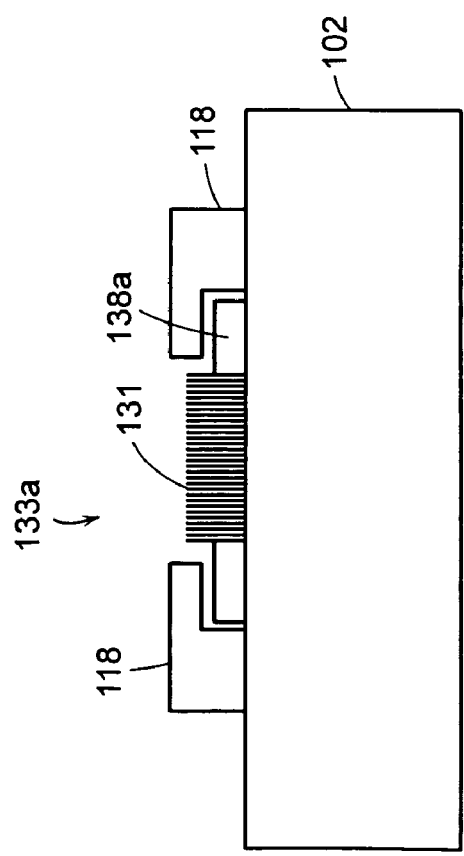
FIG. 4B is a schematic cross section of the cutting apparatus of FIG. 4A taken along line 4B—4B of FIG. 4A showing guide pieces receiving a piece weatherstripping having a flat backing.

Disposed on the top surface 114 of the base 102 are a pair of guide pieces 118 that are adjustably connected to the base 102 by fasteners, for example, machine screws. The guide pieces 118 each have two elongated slots 120 that are generally perpendicular to the side walls 116. In use, the elongated slots 120 and the fasteners enable the distance between the guide pieces 118 to be increased or decreased, as desired. Changing the distance between the adjustable guide pieces 118 enables weatherstripping with varying widths, W, to be received in the apparatus 100. See FIGS. 5B and 5C. In addition to moving relative to each other, the guide pieces 118 can also pivot relative to the base 102 and be clamped relative to the base 102, such that weatherstripping can be cut at an angle, as described in further detail below. Also, the guide pieces 118 can be shaped to receive weatherstripping having varying cross sectional profiles. For instance, the guide pieces shown in FIG. 4B can receive weatherstripping 133a having a flat backing 138a while the guide pieces shown in FIG. 4C can receive weatherstripping 133b having a curved backing 138b. As shown in FIG. 4C, one or more adapter pieces 121 may also be used to support the backing 138b of the weatherstripping 133b in the cutting apparatus 100, and optionally, can be formed integral with the base 102. The adapter pieces 121 can extend along the base 102, as necessary, to further support the backing 138b beneath the cutting member 110.

Mounted to the base 102 by bolts and disposed between the two side walls 116 is the adjustable platform 105. The adjustable platform 105 has a proximal end 122 that is nearest the cutting member 110, and a distal end 124 that is furthest from the cutting member 110. Located at the proximal end 122 of the adjustable platform 105 is an arcuate surface 126 that generally matches the arc of travel of the cutting member 110, at a slightly larger radius. Also disposed on the adjustable platform 105 is an overhanging flange or stop 128 to limit the insertion depth of the weatherstripping, as well as react cutting forces. The adjustable platform 105 can be raised or lowered by adding spacers between the adjustable platform 105 and the base 102. In another embodiment, the adjustable platform 105 can be raised or lowered on threaded screws, such that when the screws are turned, the adjustable platform 105 is moved accordingly. For a given pitch thread, the vertical travel of the adjustable platform 105 can be calibrated.

In one embodiment, the proximal end 122 of the adjustable platform 105 includes a chamfered edge 127 (FIG. 4A) so that when the adjustable platform 105 is raised, the weatherstripping can slide over the platform's proximal end 122 without catching. The angle of the chamfered edge 127 can range anywhere from about 5 degrees to about 60 degrees, and different adjustable platforms 105 with varying chamfered edges 127 can be used interchangeably on the device 100, as required to accommodate weatherstrippings of varying size.

Figure 5A:
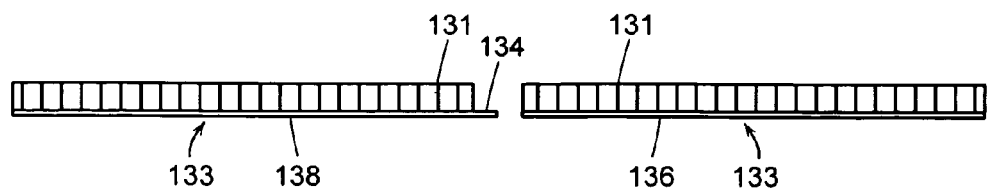
FIG. 5A is a schematic side view of two pieces of weatherstripping having a flat backing prior to splicing, one of which has been cut using the cutting apparatus of FIG. 1.
Figure 5B:
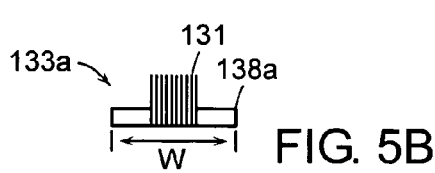
FIG. 5B is an end view of one of the pieces of weatherstripping shown in FIG. 5A.
Figure 5C:
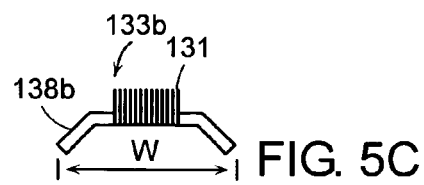
FIG. 5C is an end view of a piece of weatherstripping having a curved backing.

In use, a user adjusts the guide pieces 118 so that the distance between the guide pieces 118 substantially corresponds with the width, W, of the weatherstripping to be cut. In addition, the user determines the angle at which the sealing element 131 and backing 138 of the weatherstripping will be cut. This is accomplished by pivoting the guide pieces 118 relative to the base 102. The guide pieces 118 are then secured in place relative to the base 102 by the use of fasteners. Referring to FIGS. 4A and 5A, the user next adjusts the distance between the top surface 129 of the adjustable platform 105 and the top surface 114 of the base 102 by adding or removing spacers between the adjustable platform 105 and the base 102. The distance the adjustable platform 105 is raised or lowered adjusts the point of initial contact between the weatherstripping and the arcuate surface 126, and thus determines the length of weatherstripping that can be inserted into the apparatus 100. The greater the length of weatherstripping inserted into the apparatus 100, the greater the length of the sealing element 131 removed from the weatherstripping 133.

With continued reference to FIG. 4A, once the height of the adjustable platform 105 has been set relative to the base 102, the user guides a piece of weatherstripping 133 between the guide pieces 118 and towards the cutting member 110, such that the backing element 138 of the weatherstripping 133 slides along the top surface 114 of the base 102. As the weatherstripping 133 is further inserted into the apparatus 100, the leading end of the weatherstripping 133 slides over the chamfered edge 127 of the adjustable platform 105 and abuts the arcuate surface 126 of the adjustable platform 105, which prevents the weatherstripping from sliding further into the apparatus 100, without deformation.

Referring to FIGS. 3–5C, once the weatherstripping 133 has contacted the arcuate surface 126, the user rotates the rotatably mounted handle 104, which causes the cutting member 110 to cut the sealing element 131 of the weatherstripping and, optionally, shave off a portion of the thickness of the backing 138, leaving an exposed portion of the backing 134. As the cutting member 110 rotates relative to the base 102 and engages the weatherstripping 133, the weatherstripping 133 may be further inserted or pulled into the apparatus 100, due to the cutting forces, by sliding along the arcuate surface 126, eventually contacting the overhanging flange 128 disposed on the adjustable platform 105. Once the weatherstripping 133 contacts the overhanging flange 128, the overhanging flange 128 prevents further movement of the weatherstripping 133 into the apparatus 100. Once the piece of weatherstripping 133 has been cut, the user reverses direction of the rotatably mounted handle 104 and removes the cut weatherstripping 133 from the cutting apparatus 100.

Figure 7:
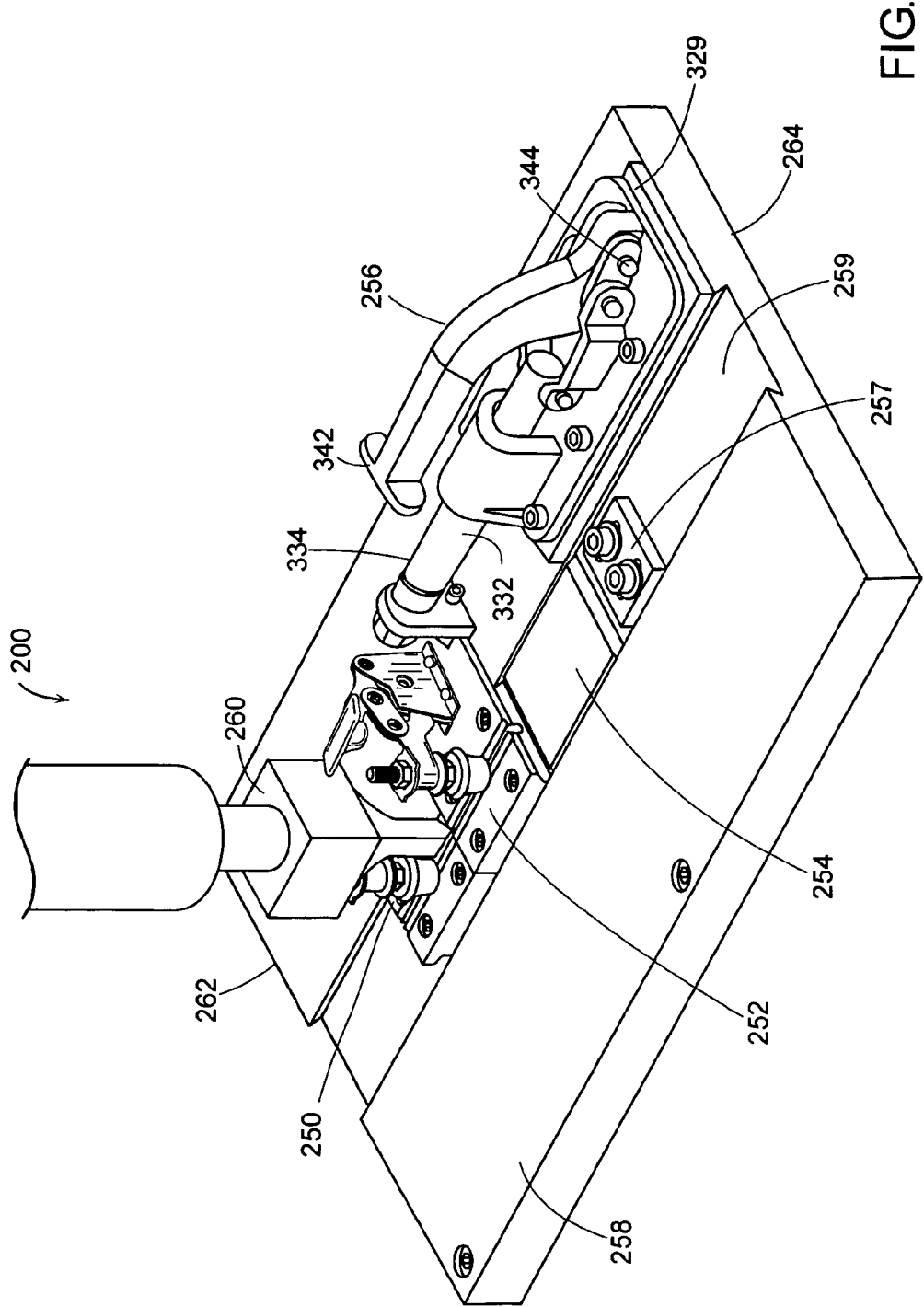
FIG. 7 is a schematic perspective view of an apparatus for ultrasonically joining the ends of weatherstripping in accordance with an embodiment of the invention.
Figure 8:
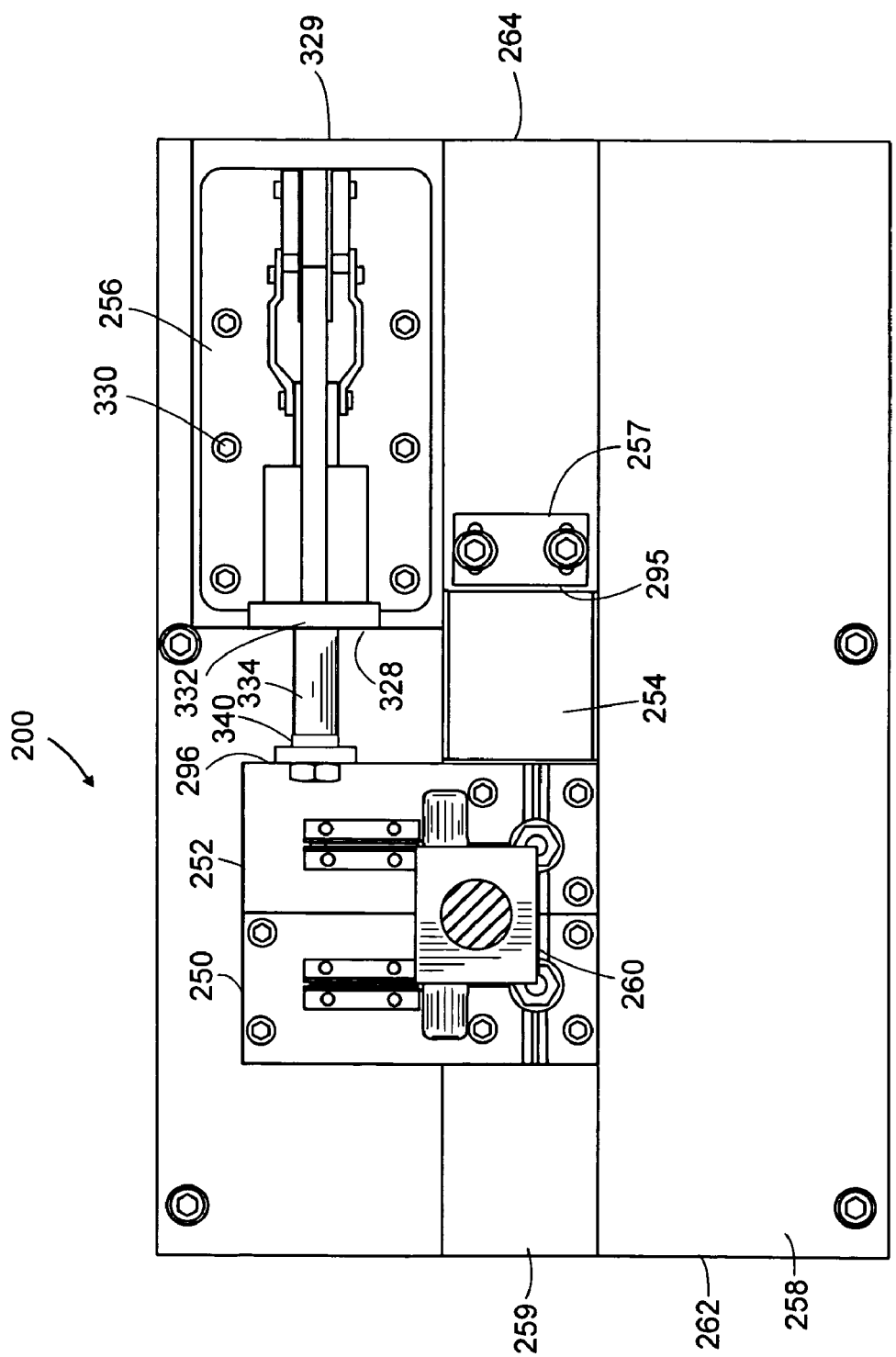
FIG. 8 is a schematic top view of the apparatus of FIG. 7.
Figure 9:
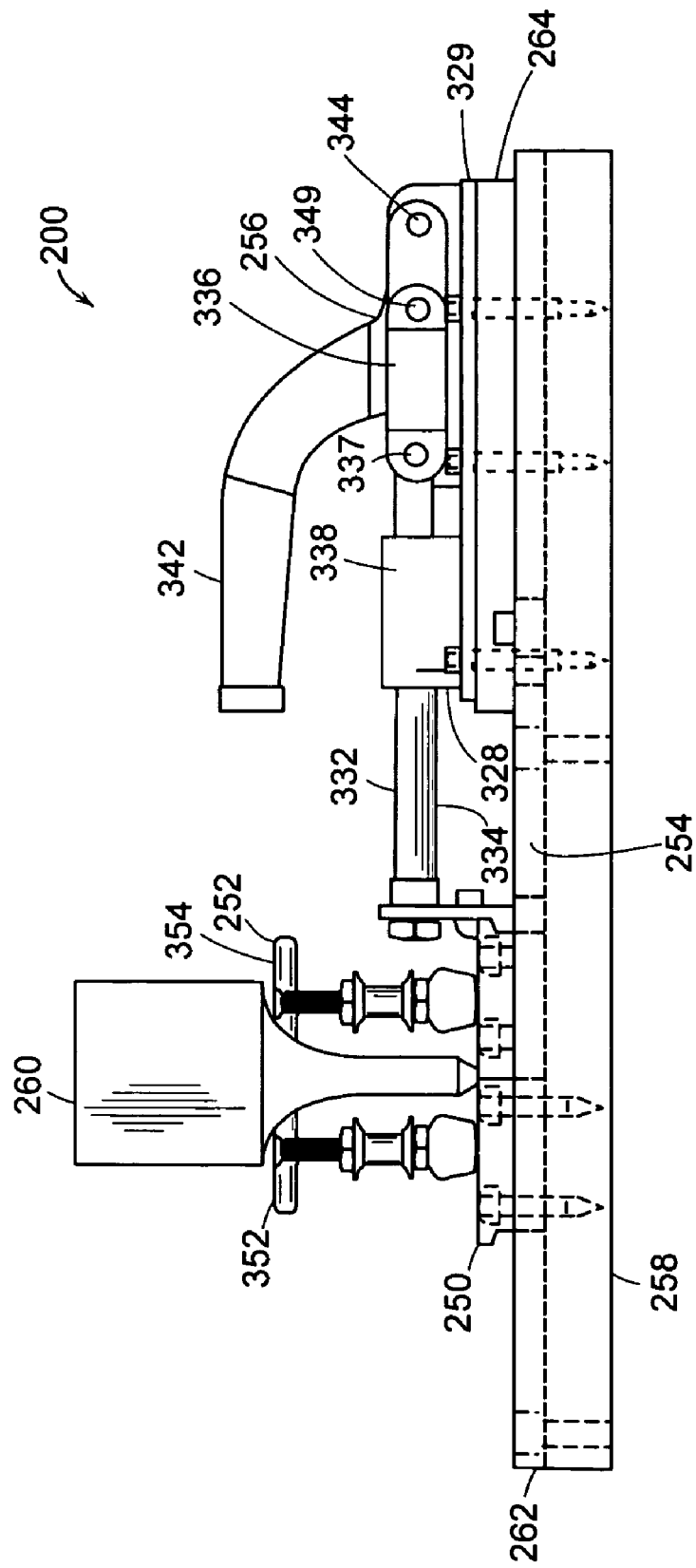
FIG. 9 is a schematic front view of the apparatus of FIG. 7.

Referring to FIGS. 7–9, an apparatus 200 for ultrasonically joining the ends of prepared weatherstripping is shown. The apparatus 200 includes a base plate 258 having mounted thereon a fixed anvil 250, a slideable anvil 252, a spacer 254, an actuator 256, and a stopper 257. The apparatus 200 can be made from metals, like aluminum, or metal alloys, and can also be made from plastics or wood. Also shown is an ultrasonic welding horn 260 that is part of the ultrasonic welding equipment used in conjunction with the splicing apparatus 200.

The base plate 258 includes a proximal end 262 and a distal end 264 defining a longitudinal length therebetween. The base plate 258 forms a channel 259 that extends from the proximal end 262 to the distal end 264. Disposed within the channel 259 are the fixed anvil 250, the slideable anvil 252, the spacer 254, and the stopper 257. The fixed anvil 250 is located proximal to the slideable anvil 252, which is in turn located proximal to the spacer 254. The spacer 254 is located proximal to the stopper 257.

Figure 10:
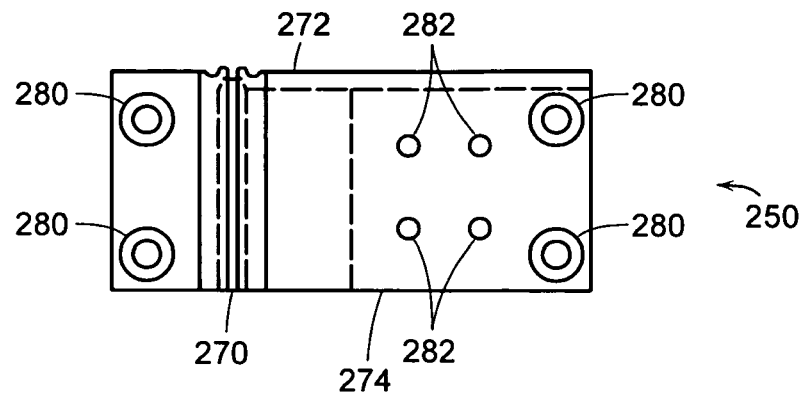
FIG. 10 is a schematic top view of a fixed anvil for use in the apparatus of FIG. 7.
Figure 11:
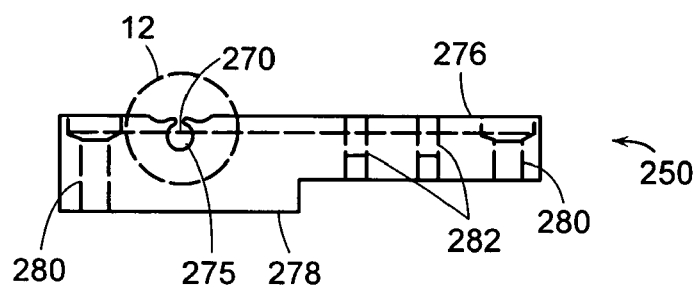
FIG. 11 is a schematic side view of the fixed anvil of FIG. 10.
Figure 12:
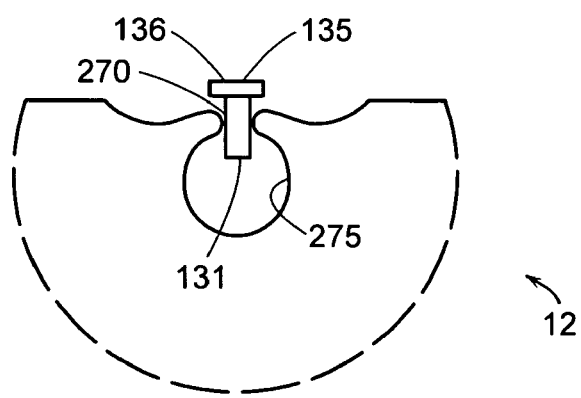
FIG. 12 is an enlarged schematic side view of a portion of the fixed anvil of FIG. 10.

Referring to FIGS. 10–12, the fixed anvil 250 is depicted in greater detail, especially the enlarged portion thereof shown in FIG. 12. The fixed anvil 250 forms a channel 270 for receiving a piece of uncut weatherstripping 135 that extends from a proximal end 272 of the fixed anvil 250 to a distal end 274 thereof. The channel 270 includes a passageway 275 that, in use, receives the sealing element 131 of the uncut weatherstripping 135. The fixed anvil 250 also includes a top surface 276 and a bottom surface 278, the bottom surface 278 being received in the channel 259 of the base plate 258. Extending from the top surface 276 to the bottom surface 278 are four through holes 280 that are used to fixedly secure the fixed anvil 250 to the base plate 258 with fasteners, such that the fixed anvil 250 cannot move in relation to the base plate 258. Also located on the top surface 276 of the fixed anvil 250 are four threaded holes 282 for receiving a clamping device 352 (FIGS. 8 and 9). In operation, the clamping device 352 is used to hold the uncut weatherstripping 135 in a fixed position in the fixed anvil 250.

Figure 13:
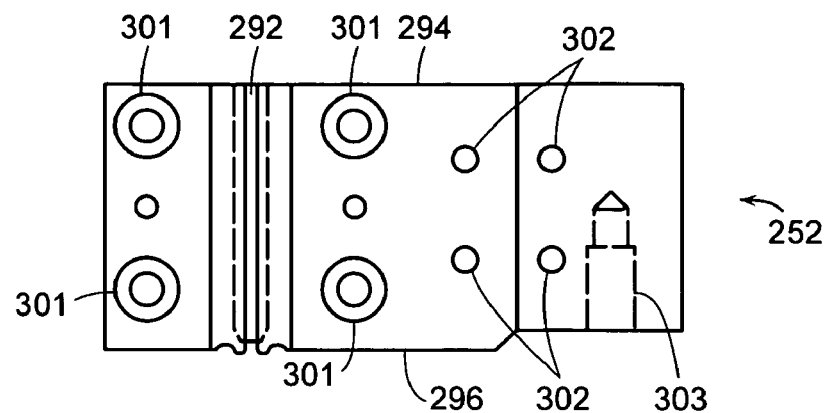
FIG. 13 is a schematic top view of a slide anvil for use in the apparatus of FIG. 7.
Figure 14:
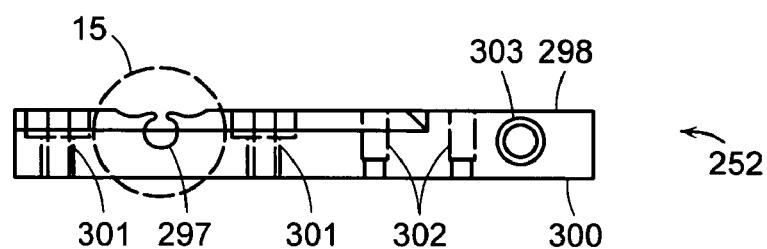
FIG. 14 is a schematic side view of the slide anvil of FIG. 13.
Figure 15:
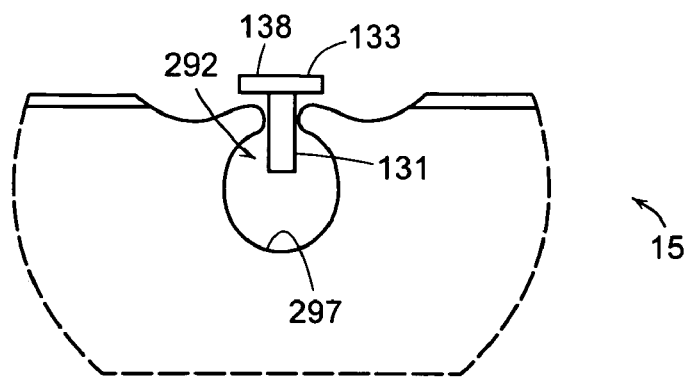
FIG. 15 is an enlarged schematic side view of a portion of the slide anvil of FIG. 13.
Figure 16:
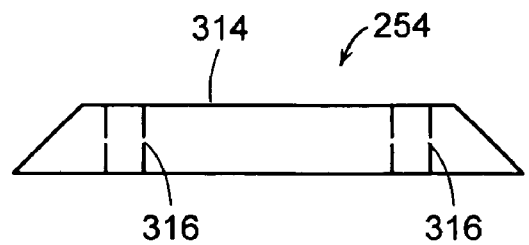
FIG. 16 is a schematic side view of a spacer for use in the apparatus of FIG. 7.

Referring to FIGS. 13–15, the slideable anvil 252 is depicted in greater detail. The slideable anvil 252 includes a channel 292 that extends from a proximal end 294 of the slideable anvil 252 to a distal end 296 thereof for receiving the cut weatherstripping 133. The channel 292 includes a passageway 297 that, in use, receives the sealing element 131 of the cut weatherstripping 133. The slideable anvil 252 also includes a top surface 298 and a bottom surface 300; the bottom surface 300, in use, resting on a top surface 314 of the spacer 254 (FIG. 16). Extending from the top surface 298 to the bottom surface 300 are four through holes 301 that are used along with fasteners to fixedly secure the slideable anvil 252 to the spacer 254. Both the slideable anvil 252 and the spacer 254 can slide in the longitudinal direction in relation to the base plate 258. Also located on the top surface 298 of the slideable anvil 252 are four threaded holes 302 for receiving a clamping device 354 (FIG. 9). In operation, the clamping device 354 is used to hold the cut weatherstripping 133 inserted into the channel 292 of the slideable anvil 252. The distal end 296 of the slideable anvil 252 also includes a threaded hole 303 that is used along with a fastener to connect the slideable anvil 252 to the actuator 256. The distal end 296 of the slideable anvil 252 can also be connected to the actuator 256 by any of a variety of mechanisms, for example, a snap fit or through the use of a clamp.

Figure 17:
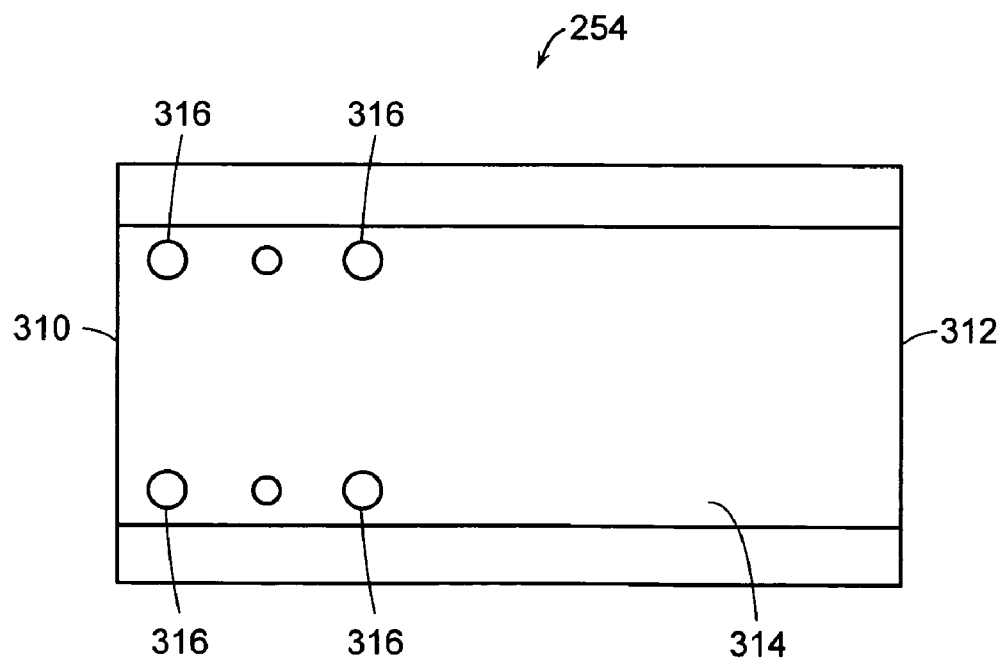
FIG. 17 is a schematic top view of the spacer of FIG. 16.

Referring to FIGS. 16 and 17, the spacer 254 is depicted in greater detail. The spacer 254 is disposed in the channel 259 of the base plate 258. The spacer 254 includes a proximal end 310 and a distal end 312 defining a longitudinal length therebetween. Located on the top surface 314 of the spacer 254 are four threaded holes 316 that are used with fasteners to secure the slideable anvil 252 to the spacer 254, such that the bottom surface 300 of the slideable anvil 252 rests on the top surface 314 of the spacer 254.

Referring now to FIGS. 8 and 9, the actuator 256 is shown in greater detail. The actuator 256 is disposed outside the channel 259 of the base plate 258 and is secured to the base plate 258 by fasteners. The actuator 256 includes a base 330 having a proximal end 328 and a distal end 329 defining a longitudinal length therebetween. Mounted to the base 330 is a piston assembly 332. The piston assembly 332 includes a cylindrical rod 334, a linking arm 336, and a bore 338, wherein the bore 338 slideably receives the cylindrical rod 334. The bore 338 is fixedly secured to the base 330 by fasteners, and the linking arm 336 and the cylindrical rod 334 can move in the longitudinal direction relative to the base 330. The proximal end 340 of the cylindrical rod 334 is connected to the distal end 296 of the slideable anvil 252 by, for example, a fastener that screws into the threaded hole 303 in the slideable anvil 252, such that movement of the cylindrical rod 334 in the longitudinal direction results in longitudinal movement of the slideable anvil 252. Longitudinal movement of the cylindrical rod 334 is controlled by a handle 342, the handle 342 rotatable about a pivot point 344, such as a pin.

Referring to FIG. 9, as the handle 342 is rotated clockwise about the pivot point 344, the linking arm 336, which is connected to the handle 342 and to the distal end 337 of the cylindrical rod 334, rotates counter-clockwise about a second pivot point 349, which causes the cylindrical rod 334 and, hence, the slideable anvil 252 to move to the right. Similarly, if the handle 342 is rotated counter-clockwise, the linking arm 336 will move in the proximal direction, which will cause the cylindrical rod 334 and, hence, the slideable anvil 252 to move to the left.

Referring again to FIGS. 5A and 10–12, to ultrasonically weld together two pieces of weatherstripping 133, 135, a user guides a first uncut piece of weatherstripping 135 into the fixed anvil 250. The uncut weatherstripping 135 is guided into the fixed anvil 250 such that the sealing element 131 of the uncut weatherstripping 135 is received in the passageway 275 and the backing 136 of the uncut weatherstripping 135 is disposed upwards. The uncut weatherstripping 135 is guided into the fixed anvil 250 until the distal end of the uncut weatherstripping 135 is aligned with the distal end 274 of the fixed anvil 250. Once the uncut weatherstripping 135 is in this position, the clamp 352 is used to fix the uncut weatherstripping 135 in relation to the fixed anvil 250, by pressing the backing 136 of the uncut weatherstripping 135 against the top surface 276 of the fixed anvil 250. Next, with reference to FIGS. 5A and 13–15, the cut weatherstripping 133, which has been cut by, for example, the cutting apparatus 100 described above, is guided into the slideable anvil 252. The cut weatherstripping 133 is inserted into the slideable anvil 252 so that the sealing element 131 is received in the passageway 297, and the backing 138 is disposed upwards. The cut weatherstripping 133 is inserted into the slideable anvil 252, such that the exposed backing 134 of the cut weatherstripping 133 overhangs the proximal end 294 of the slideable anvil 252. Once the cut weatherstripping 133 is in this position, the second clamp 354 is used to clamp the cut weatherstripping 133, such that cut weatherstripping 133 is fixed in the slideable anvil 252.

Next, the user adjusts the stopper 257 by sliding the stopper 257 in the longitudinal direction relative to the base plate 258. The stopper 257 is positioned such that when the handle 342 of the actuator 256 is rotated fully clockwise, the distal end 274 of the fixed anvil 250 will be separated from the proximal end 294 of the slideable anvil 252 by the distance of exposed backing 134 to be overlapped. The amount of weatherstripping to be overlapped is approximately equal to the portion that was cut from the weatherstripping in the cutting process described earlier. Once the stopper 257 has been adjusted, fasteners are used to secure the position of the stopper 257 relative to the base plate 258.

With further reference to FIG. 9, once the stopper 257 has been secured to the base plate 258, the handle 342 of the actuator 256 is rotated clockwise, so that the distal end 312 of the spacer 254 abuts the proximal end 295 of the stopper 257. When the distal end of the spacer 254 abuts the proximal end 295 of the stopper 257, further movement of the spacer 254 in the distal direction is prevented. In this position, the distal end 274 of the fixed anvil 250 and the proximal end 294 of the slideable anvil 252 are separated by the amount of material to be overlapped.

The handle 342 is then rotated counter-clockwise, which causes the cylindrical rod 334 and, hence, the spacer 254 and the slideable anvil 252 to slide in the proximal direction. As the slideable anvil 252 slides in the proximal direction, the cut weatherstripping 133 begins to overlap the uncut weatherstripping 135. Eventually, the distal end 274 of the fixed anvil 250 contacts the proximal end 294 of the slideable anvil 252. In this position, the exposed backing 134 of the cut weatherstripping 133 fully overlaps the uncut weatherstripping 135 and the weatherstrippings 133, 135 are ready for splicing.

Splicing of the cut and uncut weatherstrippings 133, 135 is accomplished through the use of ultrasonic welding. Ultrasonic welding involves the use of high frequency sound energy to melt and fuse together the materials to be welded. In an ultrasonic welding process, the pieces to be welded are held together under pressure, and are then subject to ultrasonic vibrations, usually at a frequency of about 20 to about 40 kHz. To splice the cut and uncut weatherstrippings 133, 135, the welding horn 260 of an ultrasonic welding machine is lowered to apply pressure to compress the exposed backing 134 of the cut weatherstripping 133 against the backing 136 of the uncut weatherstripping 135. Simultaneously, mechanical vibratory energy at an ultrasonic frequency is transferred from the welding horn 260 to the splicing area of the cut and uncut weatherstrippings 133, 135. At the splicing area, vibratory energy is converted to heat energy through friction, which melts the thermoplastic backings and splices the cut and uncut weatherstrippings 133, 135, fusing them together. The time required to splice the cut and uncut weatherstrippings 133, 135 is typically less than one second, but will depend on factors such as the vibration amplitude, the type of materials being welded, and the part geometry. After the ultrasonic welding horn 260 is moved away from the spliced weatherstripping, the weatherstripping rapidly cools and the spliced weatherstripping is removed from the apparatus 200, ready for use.

In one embodiment of the invention, the cutting apparatus 100 and the splicing apparatus 200 can be used as part of a system to create consistent splices. For instance, the adjustable platform 105 on the cutting apparatus 100 can be raised or lowered so that, for instance, 0.25 inches in length of sealing element 131 and backing 138 is removed from the weatherstripping leaving an exposed backing 134 of 0.25 inches in length. The splicing apparatus 200 can then also be configured so that 0.25 inches of overlap is created between the exposed backing 134 of the cut weatherstripping 133 and the uncut piece of weatherstripping 135. For example, the stopper 257 is secured to the base plate 258 such that the proximal end 294 of the slideable anvil 252 is spaced 0.25 inches from the distal end 274 of the fixed anvil 250 when the distal end 294 of the spacer 254 abuts the proximal end 295 of the stopper 257. Therefore, when the handle 342 of the actuator 256 is rotated counterclockwise, the exposed backing 134 of the cut weatherstripping 133 will overlap the uncut weatherstripping 135 by 0.25 inches. It is desirable to be able to cut and splice weatherstripping so that the amount of sealing element 131 and backing 138 removed from the weatherstripping corresponds to the amount of overlap in the ultrasonically welded piece of weatherstripping. By using the process described above, weatherstripping with splices having superior mechanical properties compared to conventional splices are achieved.

Figure 6A:
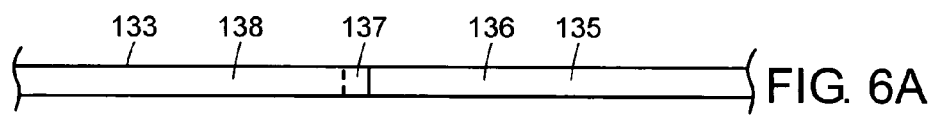
FIGS. 6A–6D are schematic bottom views of various joint configurations of two pieces of weatherstripping spliced in accordance with the invention.

FIGS. 6A–6D depict various overlapping configurations 137, 437, 537, 637 of the cut weatherstripping 133, 433, 533, 633 and the uncut weatherstripping 135, 435, 535, 635 that can be created in accordance with the invention. FIG. 6A depicts a typical straight overlapping configuration 137. In this embodiment, the weatherstripping, prior to being inserted into the cutting apparatus, is cut by, for example, a pair of scissors or a shear, such that the end of the weatherstripping is perpendicular to the side of the weatherstripping. The weatherstripping is then inserted into the cutting apparatus 100 perpendicular to the cutting member 110 such that a rectangular portion of sealing element 131 and backing 138 is cut from the weatherstripping (FIGS. 1–4C).

Figure 6B:
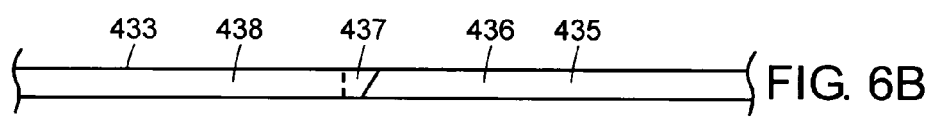
Figure 6C:
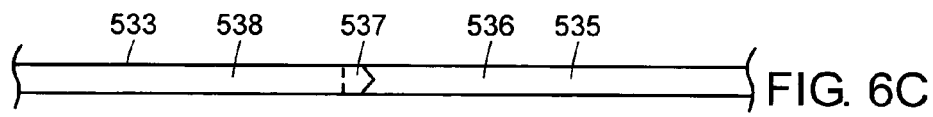

In another example, a piece of weatherstripping that has an end portion previously cut at an angle by, for example, a pair of scissors or a shear is inserted into the cutting apparatus 100 perpendicular to the cutting member 100. In this embodiment, a section of the sealing element 131 with an angled end will be cut from the weatherstripping by the cutting apparatus 100. When this piece of cut weatherstripping 433 is welded with the back of a piece of uncut weatherstripping 435, an angled overlap 437 is created, as shown in FIG. 6B. In an alternative embodiment, rather than cut the end of the weatherstripping with a pair of scissors, a piece of weatherstripping is inserted into the cutting apparatus 100 at an acute angle relative to the cutting member 110 by pivoting the guide pieces 118 relative to the base 102 as desired. In addition, the adjustable platform 105 of the cutting apparatus 100 is raised a sufficient height such that the cutting member 110 will cut through both the sealing element 131 and the backing element 438. Next, the weatherstripping is inserted into the cutting apparatus 100 a second time, this time guiding the weatherstripping into the apparatus such that the side of the weatherstripping is perpendicular to the blade member 100. When the resulting piece of cut weatherstripping 433 is welded with the back of a piece of uncut weatherstripping 435, an angled overlap 437 is created, as shown in FIG. 6B. It will be appreciated that the type of overlap is not limited to an angle, but can include a V-shape 537 (FIG. 6C), or any other desired shape.

Figure 6D:
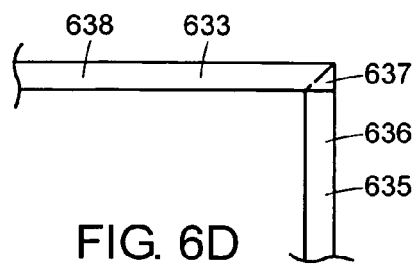

In another embodiment, shown in FIG. 6D, a miter joint 637 is created in accordance with the invention. To create the joint, a piece of weatherstripping, prior to being inserted into the cutting apparatus, is cut by, for example, a pair of scissors or a shear such that the end of the weatherstripping is perpendicular to the side of the weatherstripping. The piece of weatherstripping is then inserted into the cutting apparatus 100 at an acute angle relative to the cutting member 110 by pivoting the guide pieces 118 relative to the base 102 as desired. A portion of the sealing element 131 and backing element 638 is then removed as described above. Next, the end of a second piece of weatherstripping is cut at an acute angle by, for example a pair of scissors or a shear, and the pieces of weatherstripping 633, 635 are welded together using an apparatus as described above that has been modified to produce miter joints 637.

Other embodiments incorporating the concepts disclosed herein may be used without departing from the spirit and scope of the invention. For example, the apparatus for ultrasonically joining the ends of prepared weatherstripping can be modified with suitable adapters to receive and support weatherstrippings with different cross sectional profiles, such as different backings. See, for instance, FIGS. 5B and 5C. The apparatus can also be modified so that the manual actuation of the cutter handle 104 and/or the joiner actuator 256 is replaced by hydraulic, pneumatic, electric, or other powered devices, with suitable controls. Further, the invention is not limited to splicing of woven textile weatherstripping, but has application to a wide variety of products that have a sealing or other element extending from a weldable backer or other element. Accordingly, the described embodiments are to be considered in all respects as only illustrative and not restrictive.

What is claimed is:

1. A method of splicing weatherstripping including a sealing element and a backing element, the method comprising:
   cutting a portion of the sealing element from a first piece of weatherstripping, leaving an exposed portion of the backing element;
   overlapping the exposed portion of the backing element with a backing element of a second piece of weatherstripping; and
   ultrasonically joining the exposed portion of the backing element of the first piece of weatherstripping to the backing element of the second piece of weatherstripping.

2. The method of claim 1, wherein the exposed portion of the backing element of the first piece of weatherstripping is pressed against the backing element of the second piece of weatherstripping while ultrasonically joining the two pieces of weatherstripping.

3. The method of claim 1, wherein the cutting step further comprises cutting the exposed portion of the backing element at an angle.

4. The method of claim 1, wherein the cutting step further comprises cutting the exposed portion of the backing element in a V-shape.

5. The method of claim 1, wherein the cutting step comprises:
   inserting the first piece of weatherstripping into an apparatus; and actuating a blade to cut a portion of the sealing element.

6. The method of claim 1, wherein the cutting step is carried out with an the apparatus comprising:
   a base for receiving one end of the weatherstripping, and
   a blade moveably coupled to the base for longitudinally shaving the portion of the sealing element from the weatherstripping.

7. The method of claim 6, wherein the blade is coupled to a handle rotatably mounted to the base.

8. The method of claim 6, wherein the apparatus further comprises a track disposed on the base for receiving weatherstripping.

9. The method of claim 6, wherein the apparatus further comprises a stop disposed on the base for limiting a length of weatherstripping received by the base.

10. The method of claim 1, wherein the joining step is carried out with an apparatus comprising:
    a base including a channel for receiving the first piece of weatherstripping at one end and the second piece of weatherstripping at an opposite end, wherein the first and second pieces of weatherstripping slide relative to each other along the channel into linearly partially overlapping contact at at least one point, wherein the base is adapted to cooperate with an ultrasonic welder for joining the first piece of weatherstripping and the second piece of weatherstripping at the point of overlapping contact.

11. The method of claim 10, wherein the apparatus further comprises clamps attached to the base for holding the first piece of weatherstripping and the second piece of weatherstripping in place.

12. The method of claim 10, wherein the base comprises two pieces with one piece slideably disposed relative to the other piece.

13. The method of claim 10, wherein the apparatus further comprises means for pressing the first piece of weatherstripping and the second piece of weatherstripping together at the point of the overlapping contact.

14. The method of claim 6, wherein the blade is adapted to shave a variable predetermined thickness of the sealing element from the weatherstripping.

15. The method of claim 6, wherein the blade removes substantially an entire thickness of the sealing element at one end of the weatherstripping, leaving the exposed portion of the backing element.

16. The method of claim 6, wherein the blade is adapted to shave both an entire thickness of the sealing element and a variable predetermined thickness of the backing element from the weatherstripping.

17. The method of claim 7, wherein the blade travels substantially parallel to a longitudinal extent of the weatherstripping.

* * * * *